(12) United States Patent
Zhang et al.

(10) Patent No.: US 9,353,021 B2
(45) Date of Patent: May 31, 2016

(54) STRUCTURE OF ENERGETIC MATERIALS AND THE METHOD FOR PREPARING THEREOF

(71) Applicant: City University of Hong Kong, Kowloon (HK)

(72) Inventors: Kaili Zhang, Kowloon (HK); Jian Lu, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 143 days.

(21) Appl. No.: 14/167,491

(22) Filed: Jan. 29, 2014

(65) Prior Publication Data
US 2015/0210605 A1    Jul. 30, 2015

(51) Int. Cl.
| | | |
|---|---|---|
| *C06B 45/00* | (2006.01) | |
| *C06B 45/18* | (2006.01) | |
| *C06B 45/30* | (2006.01) | |
| *C06B 45/32* | (2006.01) | |
| *C06B 45/12* | (2006.01) | |
| *C06B 45/14* | (2006.01) | |
| *C06B 33/00* | (2006.01) | |
| *D03D 23/00* | (2006.01) | |
| *D03D 43/00* | (2006.01) | |
| *B82Y 40/00* | (2011.01) | |
| *C06B 21/00* | (2006.01) | |
| *B82Y 30/00* | (2011.01) | |

(52) U.S. Cl.
CPC ............... *C06B 45/14* (2013.01); *B82Y 40/00* (2013.01); *C06B 21/0083* (2013.01); *B82Y 30/00* (2013.01)

(58) Field of Classification Search
USPC ......... 149/2, 3, 5, 6, 14, 15, 37, 108.2, 108.8, 149/109.4, 109.6
See application file for complete search history.

(56) References Cited

U.S. PATENT DOCUMENTS

| | | | |
|---|---|---|---|
| 2002/0182436 A1* | 12/2002 | Weihs | B23K 1/0006 428/635 |
| 2009/0078345 A1* | 3/2009 | Kellett | C01B 3/04 149/5 |
| 2009/0090440 A1* | 4/2009 | Kellett | B22F 1/025 149/9 |
| 2010/0119728 A1* | 5/2010 | Johnson | B23K 23/00 427/535 |
| 2014/0102605 A1* | 4/2014 | Fritz | B32B 1/08 149/15 |

* cited by examiner

*Primary Examiner* — James McDonough
(74) *Attorney, Agent, or Firm* — Renner Kenner; Greive Bobak; Taylor & Weber

(57) ABSTRACT

The present invention also relates to a structure of energetic materials and the method for preparing thereof. The structure comprises a first layer forming on a substrate, a second layer covering the first layer, and a third layer encapsulating the second layer, wherein the first layer comprises at least one metal oxide, the second layer comprises at least one fuel material, and the third layer comprises at least one hydrophobic material so that the layered structure is substantially waterproof.

38 Claims, 5 Drawing Sheets

US 9,353,021 B2

STRUCTURE OF ENERGETIC MATERIALS AND THE METHOD FOR PREPARING THEREOF

FIELD OF THE INVENTION

The invention relates to a structure of energetic materials and the method for preparing thereof. Particularly but not exclusively, the invention relates to a waterproof layered structure of energetic materials and the method for preparing thereof.

BACKGROUND OF THE INVENTION

Energetic materials (EMs) including propellants, explosives and pyrotechnics are being widely used in both civilian and military fields such as automobile airbags, belt tensioners, mining, off-shore drilling, de-construction, heat sources for rapid fuses, joining of materials by means of localized heating, metal cutting, underwater welding, micropropulsion systems, percussion or electric primers, explosive additives, propellant rate modifiers, arms fire, and safety and arming devices used in missiles or rockets. In addition, nanoscale energetic materials (nEMs) have received growing interests because of the greatly improved performance in reaction propagation rate, ignition or onset-reaction temperature, ignition delay, and volumetric energy density compared with traditional EMs (e.g. gun powder and trinitrotoluene (TNT)).

However, the performance of nEMs will be significantly reduced by moisture in the air and furthermore, nEMs cannot react underwater. Moisture and/or water will permeate into the reactant mixture of the nEMs, which results in disintegration of the reactants before ignition and reaction, or the reaction will be quenched after ignition. Nevertheless, there has been no precedent report of waterproof nEMs or structures which allow the use of nEMs under moisture and/or water.

SUMMARY OF THE INVENTION

In accordance with a first aspect of the present invention, there is provided a method for preparing a structure of energetic materials comprising steps of: forming a metal oxide layer on a substrate; covering the metal oxide layer with a fuel material layer to form a metal oxide/fuel layer; and encapsulating the metal oxide/fuel layer with a hydrophobic material layer to form a metal oxide/fuel/hydrophobic material layer.

In an embodiment of the first aspect, the metal oxide layer comprises micro or nano-scaled structures.

In an embodiment of the first aspect, the micro or nano-scaled structures are of elongated shape.

In an embodiment of the first aspect, the micro or nano-scaled structures are in the form of an array.

In an embodiment of the first aspect, the metal oxide layer comprises at least one metal oxide selected from a group consisting of manganese dioxide ($MnO_2$), molybdenum trioxide ($MoO_3$), copper oxide (CuO), cobalt oxide ($Co_3O_4$), iron (III) oxide ($Fe_2O_3$), iron (II, III) oxide ($Fe_3O_4$), molybdenum dioxide ($MoO_2$), nickel oxide (NiO), bismuth oxide ($Bi_2O_3$), tungsten trioxide ($WO_3$) and tin dioxide ($SnO_2$).

In an embodiment of the first aspect, the step of forming the metal oxide layer is performed by at least one of physical vapor deposition, hydrothermal synthesis, chemical precipitation, solid-state thermal conversion of at least one precursor and electrochemical method.

In an embodiment of the first aspect, the step of forming the metal oxide layer further comprises steps of depositing at least one precursor material and growing of the precursor material to form the metal oxide layer.

In an embodiment of the first aspect, the at least one precursor material comprises a first adhesion layer and a second metal layer.

In an embodiment of the first aspect, the first adhesion layer comprises copper oxide (CuO), titanium (Ti), tantalum (Ta), chromium (Cr) or a mixture thereof.

In an embodiment of the first aspect, the second metal layer comprises copper (Cu), iron (Fe), cobalt (Co), nickel (Ni) or a mixture thereof.

In an embodiment of the first aspect, the first adhesion layer is deposited by at least one of sputtering, electron beam evaporation and thermal evaporation.

In an embodiment of the first aspect, the second metal layer is deposited by at least one of sputtering, electron beam evaporation, thermal evaporation and electroplating.

In an embodiment of the first aspect, the growing step comprises oxidation of the precursor material at an elevated temperature.

In an embodiment of the first aspect, the fuel material layer comprises at least one fuel material.

In an embodiment of the first aspect, the at least one fuel material comprises metal.

In an embodiment of the first aspect, the metal is selected from a group consisting of aluminum (Al), magnesium (Mg), and a mixture thereof.

In an embodiment of the first aspect, the step of covering the metal oxide layer with the fuel material layer is performed by at least one of thermal evaporation and sputtering.

In an embodiment of the first aspect, the thermal evaporation is conducted under vacuum.

In an embodiment of the first aspect, the sputtering is conducted under a flow of an inert gas.

In an embodiment of the first aspect, the inert gas comprises argon gas.

In an embodiment of the first aspect, the hydrophobic material layer comprises at least one hydrophobic material selected from a group consisting of fluoroalkylsilane (FAS), polytetrafluoroethylene (PTFE), alkylketene dimers (AKDs), poly(alkylpyrrole) and polydimethylsiloxane (PDMS).

In an embodiment of the first aspect, the metal oxide/fuel layer and the metal oxide/fuel/hydrophobic material layer comprise micro or nano-scaled structures.

In an embodiment of the first aspect, the micro or nano-scaled structures are of elongated shape.

In an embodiment of the first aspect, the micro or nano-scaled structures are in the form of an array.

In an embodiment of the first aspect, the step of encapsulating the metal oxide/fuel layer is performed by at least one of chemical vapor deposition, physical vapor deposition, spin-coating, electrospinning, electrospray, aerosol deposition and solution based method.

In an embodiment of the first aspect, further comprising a step of cleaning the substrate prior to the step of forming the metal oxide layer.

In accordance with a second aspect of the present invention, there is provided a structure of energetic materials, comprising: a first layer being formed on a substrate, a second layer covering the first layer, and a third layer encapsulating the second layer, wherein the first layer comprises at least one metal oxide, the second layer comprises at least one fuel material, and the third layer comprises at least one hydrophobic material so that the structure is substantially waterproof.

In an embodiment of the second aspect, the first layer comprises micro or nano-scaled structures.

In an embodiment of the second aspect, the micro or nano-scaled structures of the first layer are of elongated shape.

In an embodiment of the second aspect, the micro or nano-scaled structures of the first layer are in the form of an array.

In an embodiment of the second aspect, the at least one metal oxide is selected from a group consisting of manganese dioxide ($MnO_2$), molybdenum trioxide ($MoO_3$), copper oxide (CuO), cobalt oxide ($Co_3O_4$), iron (III) oxide ($Fe_2O_3$), iron (II, III) oxide ($Fe_3O_4$), molybdenum dioxide ($MoO_2$), nickel oxide (NiO), bismuth oxide ($Bi_2O_3$), tungsten trioxide ($WO_3$) and tin dioxide ($SnO_2$).

In an embodiment of the second aspect, the at least one fuel material comprises metal.

In an embodiment of the second aspect, the metal is selected from a group consisting of aluminum (Al), magnesium (Mg), and a mixture thereof.

In an embodiment of the second aspect, the at least one hydrophobic material is selected from a group consisting of fluoroalkylsilane (FAS), polytetrafluoroethylene (PTFE), alkylketene dimers (AKDs), poly(alkylpyrrole) and polydimethylsiloxane (PDMS).

In an embodiment of the second aspect, the fluoroalkylsilane comprises trichloro(1H,1H,2H,2H-perfluorooctyl)silane.

In an embodiment of the second aspect, the structure of energetic materials comprising micro or nano-scaled structures.

In an embodiment of the second aspect, the micro or nano-scaled structures of the structure of energetic materials are of elongated shape.

In an embodiment of the second aspect, the micro or nano-scaled structures of the structure of energetic materials are in the form of an array.

Further aspects of the invention will become apparent from the following description of the drawings, which are given by way of example only to illustrate the invention.

DETAILED DESCRIPTION OF THE PREFERRED EMBODIMENTS

The present invention relates to a method for preparing a structure of energetic materials. The method comprises steps of forming a metal oxide layer on a substrate, covering the metal oxide layer with a fuel material layer to form a metal oxide/fuel layer, and encapsulating the metal oxide/fuel layer with a hydrophobic material layer to form a metal oxide/fuel/hydrophobic material layer.

The present invention also relates to a structure of energetic materials. The structure comprises a first layer forming on a substrate, a second layer covering the first layer, and a third layer encapsulating the second layer, wherein the first layer comprises at least one metal oxide, the second layer comprises at least one fuel material, and the third layer comprises at least one hydrophobic material so that the structure is substantially waterproof.

Particularly, the present invention relates to the development of waterproof nano energetic material (nEM) arrays having layered or sandwich structure. The waterproof nEM arrays are capable of preventing moisture and/or water from entering the composite before and during the exothermic reaction of nEMs, so that the nEMs can be practically applied in humid environment or under water.

More particularly, the invention provides facile methods to synthesize the waterproof layered nEM arrays. The synthesized nEM arrays demonstrated excellent performance including low ignition temperature, high heat release, high gas generation, fast reaction propagation rate, and suitability for long term storage.

Figure 1:
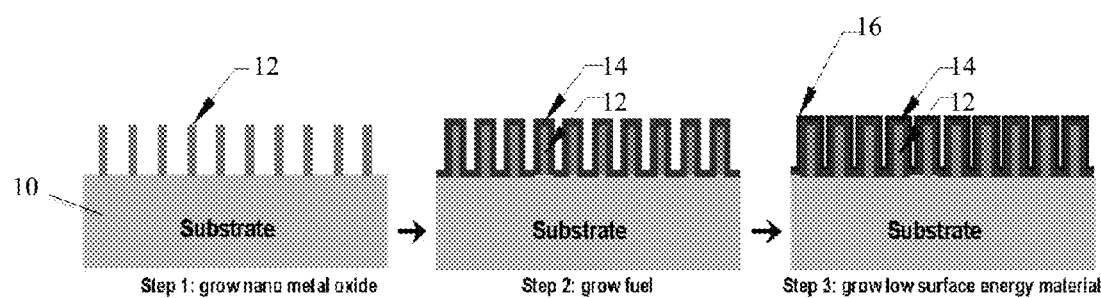
FIG. 1 is a schematic diagram showing a first embodiment of the present invention.

FIG. 1 shows the steps of preparing a first embodiment of the nEM arrays of the present invention. In the first step as shown in the figure, a metal oxide, such as manganese dioxide ($MnO_2$), molybdenum trioxide ($MoO_3$), copper oxide (CuO), cobalt oxide ($Co_3O_4$), iron (III) oxide ($Fe_2O_3$), iron (II, III) oxide ($Fe_3O_4$), molybdenum dioxide ($MoO_2$), nickel oxide (NiO), bismuth oxide ($Bi_2O_3$), tungsten trioxide ($WO_3$), tin dioxide ($SnO_2$) or a mixture thereof, was deposited on a substrate 10 to form an array of nano structures 12 of metal oxide. In this embodiment, the metal oxide nano structures 12 are of elongated structures, e.g. in the form of an array of nanorods or nanowires (see Step 1 of FIG. 1). However, it should be appreciated that nanostructures of other sizes (e.g. in micron scale) or of other shapes or configurations may also be applicable, as along as a person skilled in the art may consider suitable for this purpose. In this embodiment, each of the nanorod is of a length of approximately 100 nm to 100 μm, and a diameter or width of approximately 10 nm to 500 nm.

Prior to the formation of the metal oxide layer, the substrate 10, such as a silicon wafer, was previously cleaned with known cleaning steps for surface treatment, for example, by washing with solvent under ultrasonic vibration. After cleaning and drying, the metal oxide layer can be formed by deposition methods such as physical vapor deposition (for example, sputtering, electron beam evaporation, thermal evaporation), hydrothermal synthesis, chemical precipitation methods, solid-state thermal conversion of one or more precursors, electrochemical methods. It should be appreciated that the present invention should not be limited to the deposition methods as described in the specific embodiments, but a person skilled in the art would understand that the effect of "forming", "formation", "deposit" or "deposition" of the metal oxide can be resulted from any possible chemical and/or physical surface treatment methods, as long as they are considered suitable in this relevant field. The term "form", "formation", "deposit" or "deposition" may include physical surface coating, chemical deposition, chemical etching, or in situ growing of a layer on the surface of the substrate.

In the second step, a fuel material 14, which can be any substances which are capable of releasing heat energy when reacting with metal oxides, was deposited on the metal oxide array 12 and the substrate 10 to substantially cover the metal oxide nano structures 12. As show in Step 2 of FIG. 1, the metal oxide nanorods 12 was substantially covered and encased by a layer of the fuel material 14 to form a core-shell, rod-shaped structure. In this embodiment, each of the rod-shaped metal oxide/fuel material core-shell structure is of a length of approximately 110 nm to 102 μm, and a diameter or width of approximately 20 nm to 2.5 μm.

Examples of the fuel material include, but are not limited to, metals such as aluminum (Al), magnesium (Mg) or a mixture thereof. The deposition of the fuel material can be conducted by, for example, thermal evaporation under vacuum or sputtering under a flow of inert gas such as argon gas. Again, it should be appreciated that the present invention should not be limited to the specific deposition methods as described in this embodiment. Any other suitable chemical and/or physical surface treatment methods, as long as they are considered applicable for this purpose, should also be encompassed by the present invention.

In the third step, a layer of hydrophobic material was further deposited onto the array of metal oxide/fuel material core-shell structures to substantially encapsulate the fuel material and the metal oxide to form an array of encapsulated, metal oxide/fuel material/hydrophobic material nanostructures (see Step 3 of FIG. 1). The hydrophobic material prevents the penetration of moisture and/or water into the fuel material layer, and thus provides the waterproof property to the nEMs. The hydrophobic material includes, but is not limited to, fluoroalkylsilane (FAS) such as trichloro(1H,1H,2H,2H-perfluorooctyl)silane (PFOCTS), polytetrafluoroethylene (PTFE, i.e. Teflon), alkylketene dimers (AKDs), poly(alkylpyrrole), polydimethylsiloxane (PDMS) or a mixture thereof. Again, it should be appreciated that the present invention should not be limited to the hydrophobic materials as described in this embodiment. Any other suitable hydrophobic materials, as long as they are considered applicable for this purpose, should also be encompassed by the present invention. The encapsulation provided by the hydrophobic layer, together with the nano array structure allow a superior waterproof property to the nEMs. In this embodiment, each of the encapsulated nanostructure is of a length of approximately 112 nm to 102 μm, and a diameter or width of approximately 22 nm to 2.5 μm.

The step of depositing the hydrophobic material so as to encapsulate the inner layers of fuel material and metal oxide can be conducted by chemical vapor deposition, physical vapor deposition, spin-coating, electrospinning, electrospray, aerosol deposition, solution based methods for example, dip-coating or any other surface treatments method which are considered suitable for this purpose.

A cleaning step may also be involved prior to every deposition step. It will be appreciated that the general method of cleaning a treated surface is known in the art, and will depend on the type of treatments and the materials used etc.

Figure 2:
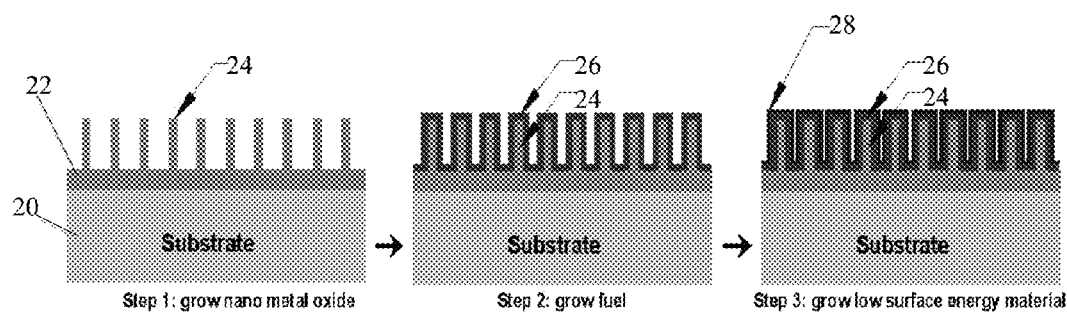
FIG. 2 is a schematic diagram showing a second embodiment of the present invention.

FIG. 2 shows another embodiment of the present invention. In this embodiment, a layer of precursor materials 22 was first deposited onto a substrate 20. The precursor materials 22 comprises a first thin adhesion layer, such as but not limited to copper oxide (CuO), titanium (Ti), tantalum (Ta) and chromium (Cr), followed by a second metal layer, such as but not limited to copper (Cu), iron (Fe), cobalt (Co) and nickel (Ni). The metal layer on the substrate 20 was then allowed to oxidize at an elevated temperature for the growing of an array of metal oxide nanostructures 24 (see Step 1 of FIG. 2).

Specifically, the first thin adhesion layer of the precursor materials 22 can be deposited by sputtering, electron beam evaporation, or thermal evaporation, and that the second metal layer of the precursor materials 22 can be deposited by sputtering, electron beam evaporation, thermal evaporation, or electroplating. However, it is appreciated that the deposition methods should not be limited to the specific examples as disclosed in this embodiment. Any suitable chemical and/or physical surface treatment methods, as long as they are considered applicable for this purpose, would also be encompassed by the present invention.

The next steps is to deposit a fuel material layer 26 to cover the metal oxide nanostructures 24 (as shown in Step 2 of FIG. 2), and subsequently deposit a hydrophobic material layer 28 to encapsulate the metal oxide/fuel material nanostructures. The method and procedure of these steps are similar to those as discussed in the first embodiment, and therefore would not be repeated here.

EXAMPLES

Example 1

Figure 3:
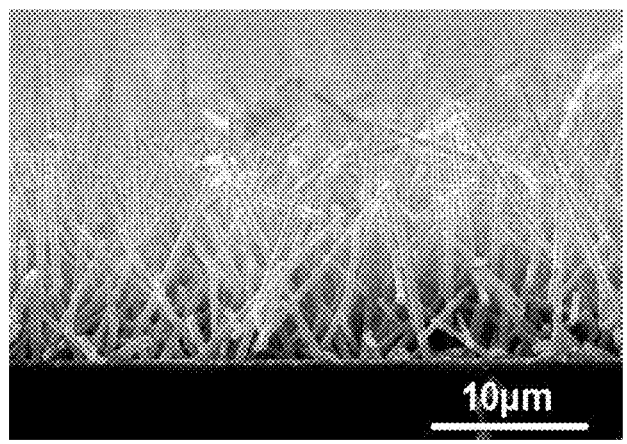
FIG. 3 is a Scanning Electron Microscopy (SEM) micrograph showing the $Co_3O_4$ nanorods according to the first embodiment as shown in step 1 of FIG. 1.
Figure 4:
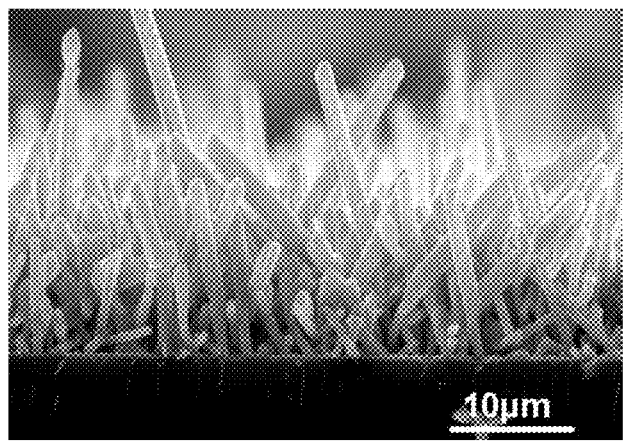
FIG. 4 is a SEM micrograph showing the $Co_3O_4$/Al nanorods according to the first embodiment as shown in step 2 of FIG. 1.

2.91 g $Co(NO_3)_2.6H_2O$ was dissolved in 7.5 ml deionized (DI) water. 40 ml 25% concentrated ammonia was then slowly instilled into the solution with magnetic stirring. After the solution was stirred for 30 minutes, it was transferred to a petri dish. A silicon wafer was immersed and supported in the solution with a distance of 3 mm form the bottom of the petri dish. The wafer inside the solution in the petri dish was kept in a drying oven at 90° C. for 13 hours. Then the wafer was taken out, carefully washed with DI water, and heated up to 250° C. for 4 hours in a furnace. During the thermal treatment process, $Co_3O_4$ nanorods arrays were grown on the surface of the silicon wafer, as shown in the SEM micrograph of FIG. 3. Al was then deposited onto the $Co_3O_4$ nanorods by thermal evaporation under a vacuum level of $4.5 \times 10'$ mbar to realize the array of $Co_3O_4$/Al core-shell nano structures on the silicon substrate, as shown in the SEM micrograph of FIG. 4.

The surface of the $Co_3O_4$/Al core-shell nanostructures array was then chemically modified by PFOCTS (molecular formula: $CF_3(CF_2)_5CH_2CH_2—Si(Cl)_3$) to decrease the surface free energy. The samples were immersed in 1 mM PFOCTS in hexane solution for 30 minutes at room temperature to get $Co_3O_4$/Al/PFOCTS sandwich nEMs array.

Figure 5:
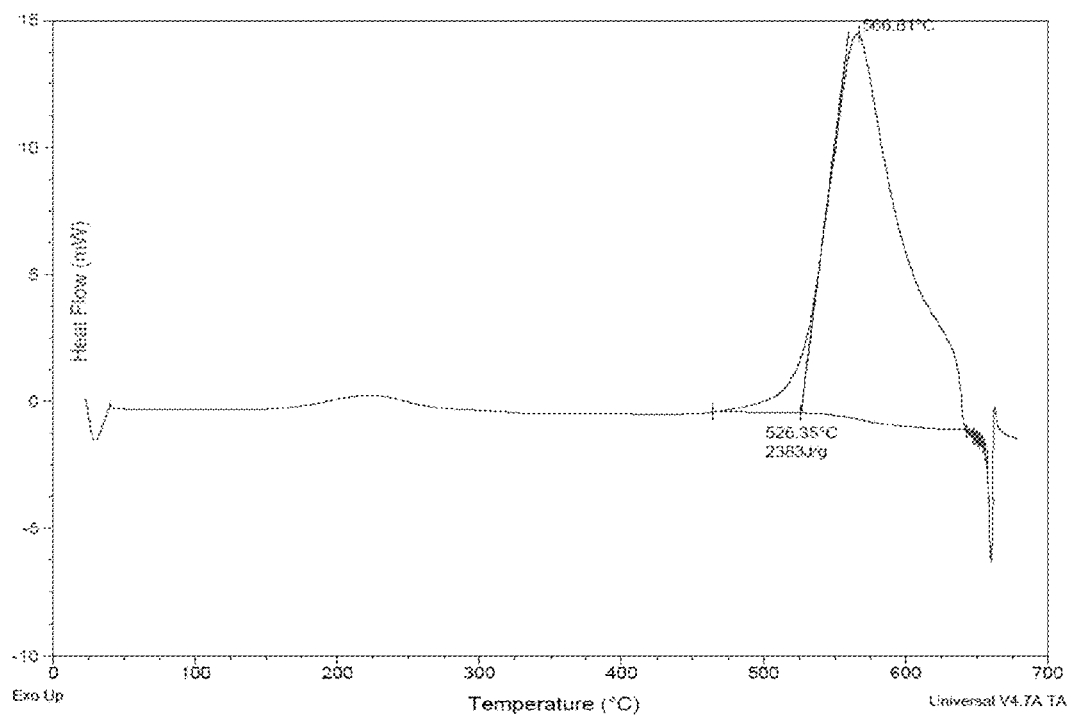
FIG. 5 is the Differential Scanning calorimetry (DSC) result showing the heat of reaction of the $Co_3O_4$/Al/PFOCTS nano array according to the first embodiment as shown in FIG. 1.

The heat of reaction of the synthesized nEMs array was measured by differential scanning calorimetry (DSC), which is a technique determining the variation in the heat flow given out or taken in by a sample when it undergoes temperature scanning in a controlled atmosphere. The DSC testing was performed from 40 to 680° C. at a rate of 5° C./min under 75 ml/min Ar flow. FIG. 5 shows the resulted DSC curve showing a heat of reaction of 2383 J/g, indicating a very high heat release property of the synthesized nEMs. The onset-reaction temperature of the major exothermic reaction is around 520° C., which is lower than the melting temperature of aluminum (Al) (about 660° C.), indicating a solid-solid reaction. The endothermic peak at around 660° C. is corresponding to the melting of the remaining aluminum (Al).

Figure 6:
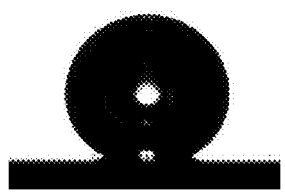
FIG. 6 is an image showing result of the Water Drop Contact Angle (WDCA) test on the $Co_3O_4$/Al/PFOCTS nano array according to the first embodiment as shown in FIG. 1.

Water Drop Contact Angle (WDCA) of the synthesized nEM array was also measured by ramé-hart model 500 attached with a CCD camera and DROP image advanced software at room temperature. Droplets of DI water with the volume of 5 μL were used to measure the static contact angle (CA). As shown in FIG. 6, the CA of the water droplet on the synthesized nEM array is 156°, which confirms the superhydrophobic property of the synthesized nEM. Based on the Wenzel model and/or Cassie-Baxter model, it is well-known that when hydrophobic material (i.e. PFOCTS in this example) is deposited onto nano-textures ($Co_3O_4$/Al nanorods in this example), superhydrophobic surface will form.

Example 2

Figure 7:
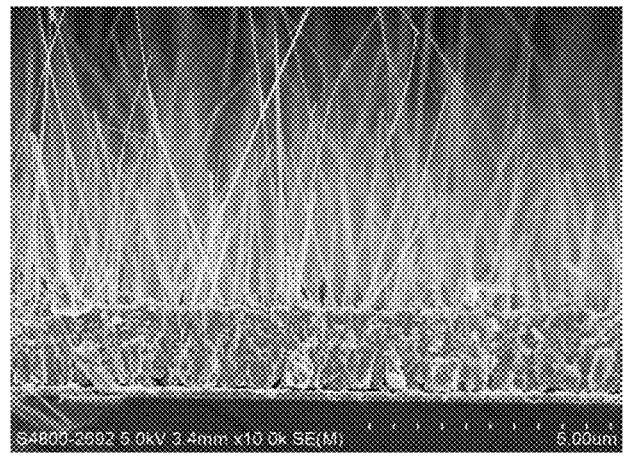
FIG. 7 is a SEM micrograph showing the CuO nanowires according to the second embodiment as shown in step 1 of FIG. 2.
Figure 8:
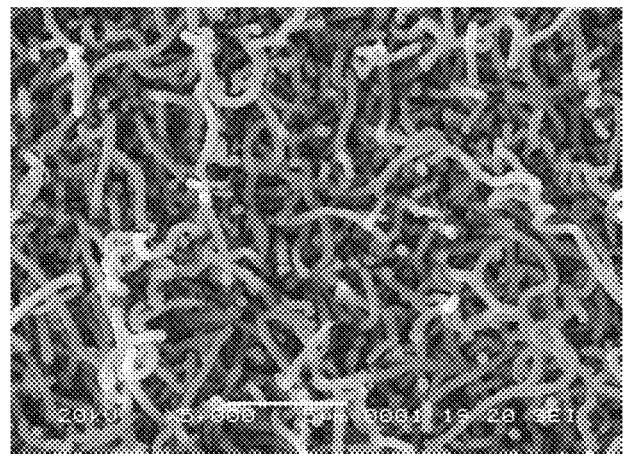
FIG. 8 is a SEM micrograph showing the CuO/Al nanowires according to the second embodiment as shown in step 2 of FIG. 2.

A 100 nm thick CuO was deposited by sputtering onto a silicon substrate followed by 1 μm Cu deposition by e-beam evaporation. The substrate with the CuO/Cu films was thermally oxidized at 400° C. for 12 h in static air in a furnace to grow aligned CuO film/nanowires, as shown in the SEM micrograph of FIG. 7. Al with a thickness of 1 μm was then deposited around the CuO nanowires by thermal evaporation to obtain the CuO/Al nanostructures array, as shown in the SEM micrograph of FIG. 8. A 10 nm thick PTFE (Teflon) was then deposited onto the CuO/Al nanostructures array by sputtering to form the CuO/Al/PTFE nEM array.

Figure 9:
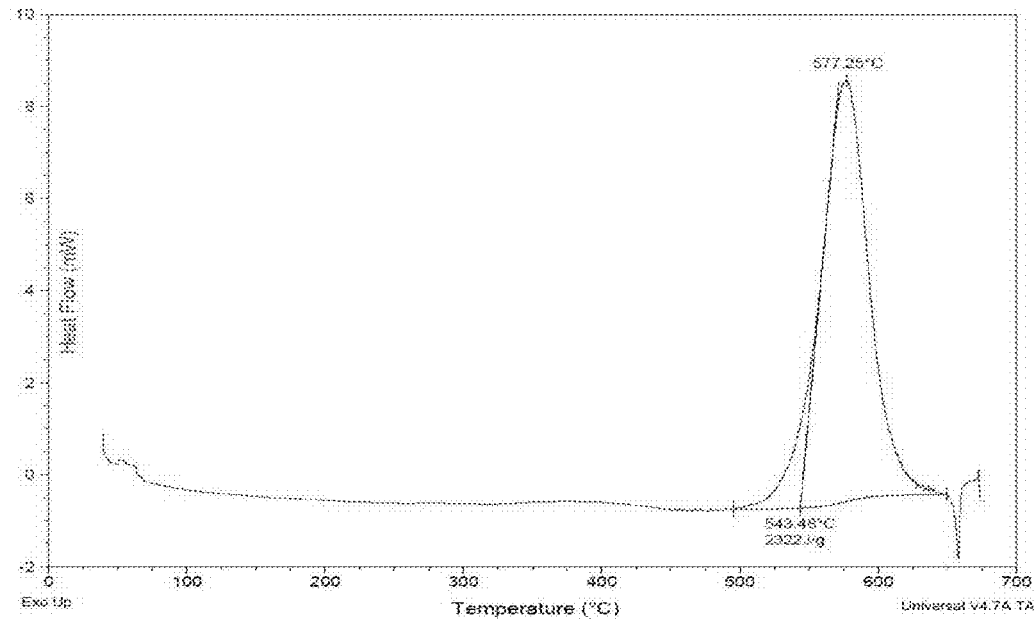
FIG. 9 is the DSC result showing the heat of reaction of the CuO/Al/PTFE nano array according to the second embodiment as shown in FIG. 2.
Figure 10:
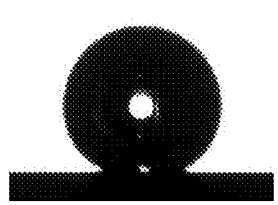
FIG. 10 is an image showing result of the WDCA test on the CuO/Al/PTFE nano array according to the second embodiment as shown in FIG. 2.

The heat of reaction of the synthesized nEM array was measured by DSC. FIG. 9 shows a high heat of reaction of 2322 J/g. The WDCA of the nEM array was also measured at room temperature with a value of 161°, as shown in FIG. 10, which confirms the superhydrophobic property of the synthesized nEM array.

When the nEM array is ignited during a practical application, the fuel material of the nEM will react with the metal-oxide to release large amount of heat and gas with fast reaction speed. The low-surface-energy of the outer hydrophobic layer together with the nano array structure provide a superior waterproof property, which allow the nEM array to be used in humid environment or underwater. In addition, the encapsulation by the stable and low-surface-energy outer layer also allow the nEM array to be suitable for long term storage, and still retains the exothermic reactivity.

The waterproof, sandwich-structured nEM arrays show promising applications in both civilian and defense fields including automobile airbags, belt tensioners, mining, off-shore drilling, de-construction, heat sources for rapid fuses, joining of materials by means of localized heating, metal cutting, underwater welding, micropropulsion systems, percussion or electric primers, explosive additives, propellant rate modifiers, arms fire, and safety and arming devices used in missiles or rockets. They are especially useful for applications in humid or underwater environments such as off-shore drilling, underwater welding/torch/cutting, mining, power sources in humid or underwater environments, and munitions for underwater use.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable subcombination.

The invention claimed is:

1. A method for preparing a structure of energetic materials, comprising steps of:
    forming a metal oxide layer on a substrate;
    covering the metal oxide layer with a fuel material layer to form a metal oxide/fuel layer; and
    encapsulating the metal oxide/fuel layer with a hydrophobic material layer to form a metal oxide/fuel/hydrophobic material layer;
    wherein the structure of energetic materials is substantially waterproof.

2. The method according to claim 1, wherein the metal oxide layer comprises micro or nano-scaled structures.

3. The method according to claim 2, wherein the micro or nano-scaled structures are of elongated shape.

4. The method according to claim 2, wherein the micro or nano-scaled structures are in the form of an array.

5. The method according to claim 1, wherein the metal oxide layer comprises at least one metal oxide selected from a group consisting of manganese dioxide ($MnO2$), molybdenum trioxide ($MoO3$), copper oxide (CuO), cobalt oxide ($Co3O4$), iron (III) oxide ($Fe2O3$), iron (II, III) oxide ($Fe3O4$), molybdenum dioxide ($MoO2$), nickel oxide (NiO), bismuth oxide ($Bi2O3$), tungsten trioxide ($WO3$) and tin dioxide ($SnO2$).

6. The method according to claim 1, wherein the step of forming the metal oxide layer is performed by at least one of physical vapor deposition, hydrothermal synthesis, chemical precipitation, solid-state thermal conversion of at least one precursor and electrochemical method.

7. The method according to claim 1, wherein the step of forming the metal oxide layer further comprises steps of depositing at least one precursor material and growing of the precursor material to form the metal oxide layer.

8. The method according to claim 7, wherein the at least one precursor material comprises a first adhesion layer and a second metal layer.

9. The method according to claim 8, wherein the first adhesion layer comprises copper oxide (CuO), titanium (Ti), tantalum (Ta), chromium (Cr) or a mixture thereof.

10. The method according to claim 8, wherein the second metal layer comprises copper (Cu), iron (Fe), cobalt (Co), nickel (Ni) or a mixture thereof.

11. The method according to claim 8, wherein the first adhesion layer is deposited by at least one of sputtering, electron beam evaporation and thermal evaporation.

12. The method according to claim 8, wherein the second metal layer is deposited by at least one of sputtering, electron beam evaporation, thermal evaporation and electroplating.

13. The method according to claim 7, wherein the growing step comprises oxidation of the precursor material at an elevated temperature.

14. The method according to claim 1, wherein the fuel material layer comprises at least one fuel material.

15. The method according to claim 14, wherein the at least one fuel material comprises metal.

16. The method according to claim 15, wherein the metal is selected from a group consisting of aluminum (Al), magnesium (Mg), and a mixture thereof.

17. The method according to claim 1, wherein the step of covering the metal oxide layer with the fuel material layer is performed by at least one of thermal evaporation and sputtering.

18. The method according to claim 17, wherein the thermal evaporation is conducted under vacuum.

19. The method according to claim 17, wherein the sputtering is conducted under a flow of an inert gas.

20. The method according to claim 19, wherein the inert gas comprises argon gas.

21. The method according to claim 1, wherein the hydrophobic material layer comprises at least one hydrophobic material selected from a group consisting of fluoroalkylsilane (FAS), polytetrafluoroethylene (PTFE), alkylketene dimers (AKDs), poly(alkylpyrrole) and polydimethylsiloxane (PDMS).

22. The method according to claim 1, wherein the metal oxide/fuel layer and the metal oxide/fuel/hydrophobic material layer comprise micro or nano-scaled structures.

23. The method according to claim 22, wherein the micro or nano-scaled structures are of elongated shape.

24. The method according to claim 22, wherein the micro or nano-scaled structures are in the form of an array.

25. The method according to claim 1, wherein the step of encapsulating the metal oxide/fuel layer is performed by at least one of chemical vapor deposition, physical vapor deposition, spin-coating, electrospinning, electrospray, aerosol deposition and solution based method.

26. The method according to claim 1, further comprising a step of cleaning the substrate prior to the step of forming the metal oxide layer.

27. A structure of energetic materials, comprising:
a first layer being formed on a substrate, a second layer covering the first layer, and a third layer encapsulating the second layer, wherein the first layer comprises at least one metal oxide, the second layer comprises at least one fuel material, and the third layer comprises at least one hydrophobic material so that the structure is substantially waterproof.

28. The structure according to claim 27, wherein the first layer comprises micro or nano-scaled structures.

29. The structure according to claim 28, wherein the micro or nano-scaled structures are of elongated shape.

30. The structure according to claim 28, wherein the micro or nano-scaled structures are in the form of an array.

31. The structure according to claim 27, wherein the at least one metal oxide is selected from a group consisting of manganese dioxide ($MnO_2$), molybdenum trioxide ($MoO_3$), copper oxide (CuO), cobalt oxide ($Co_3O_4$), iron (III) oxide ($Fe_2O_3$), iron (II, III) oxide ($Fe_3O_4$), molybdenum dioxide ($MoO_2$), nickel oxide (NiO), bismuth oxide ($Bi_2O_3$), tungsten trioxide ($WO_3$) and tin dioxide ($SnO_2$).

32. The structure according to claim 27, wherein the at least one fuel material comprises metal.

33. The structure according to claim 32, wherein the metal is selected from a group consisting of aluminum (Al), magnesium (Mg), and a mixture thereof.

34. The structure according to claim 27, wherein the at least one hydrophobic material is selected from a group consisting of fluoroalkylsilane (FAS), polytetrafluoroethylene (PTFE), alkylketene dimers (AKDs), poly(alkylpyrrole) and polydimethylsiloxane (PDMS).

35. The structure according to claim 34, wherein the fluoroalkylsilane comprises trichloro(1H,1H,2H,2H-perfluorooctyl)silane.

36. The structure according to claim 27 comprising micro or nano-scaled structures.

37. The structure according to claim 36, wherein the micro or nano-scaled structures are of elongated shape.

38. The structure according to claim 36, wherein the micro or nano-scaled structures are in the form of an array.

\* \* \* \* \*